United States Patent [19]

Hofmann

[11] 4,148,068
[45] Apr. 3, 1979

[54] TELEVISION SYNCHRONIZING SIGNAL SEPARATING CIRCUIT

[75] Inventor: Judson A. Hofmann, Schaumberg, Ill.

[73] Assignee: Zenith Radio Corporation, Glenview, Ill.

[21] Appl. No.: 802,698

[22] Filed: Jun. 2, 1977

[51] Int. Cl.² .............................................. H04N 5/08
[52] U.S. Cl. ..................................... 358/153; 358/174
[58] Field of Search ................ 358/153, 174, 176, 178

[56] References Cited

U.S. PATENT DOCUMENTS

| | | | |
|---|---|---|---|
| 3,439,115 | 4/1969 | Pollak | 358/178 |
| 3,624,290 | 11/1971 | Hofmann | 358/178 |
| 3,639,780 | 2/1972 | Lovelace | 358/176 |
| 3,697,883 | 10/1972 | Wilcox | 358/179 |
| 3,879,576 | 4/1975 | Okada et al. | 358/153 |

Primary Examiner—Richard Murray
Attorney, Agent, or Firm—Nicholas A. Camasto; Roy A. Ekstrand

[57] ABSTRACT

A television receiver has a tuner, an intermediate frequency amplifier, and a detector for recovering a composite signal including horizontal and vertical display synchronization components and picture information. Horizontal display means produce a long-duration trace signal and short-duration retrace signal and a coincidence gated AGC system which is responsive to coincidence of the horizontal retrace signal and horizontal synchronization signal controls the gain of the intermediate frequency amplifier. A combination synchronizing signal separation and AGC lock-out defeat circuit comprises a transistor, having an input electrode DC coupled to the detector, a common electrode coupled to a charge-discharge circuit such that the input-to-common electrode junction of the transistor and the charge-discharge circuit cooperate to establish a bias voltage dependent upon the occurrence and amplitude of the display synchronization signals, and an output electrode DC coupled to the AGC system. An override system response to said bias means overcomes the coincidence requirement of the AGC system to render said AGC operative solely in response to the occurrence of horizontal retrace signals when the bias indicates prolonged absence of sync pulse signals.

9 Claims, 3 Drawing Figures

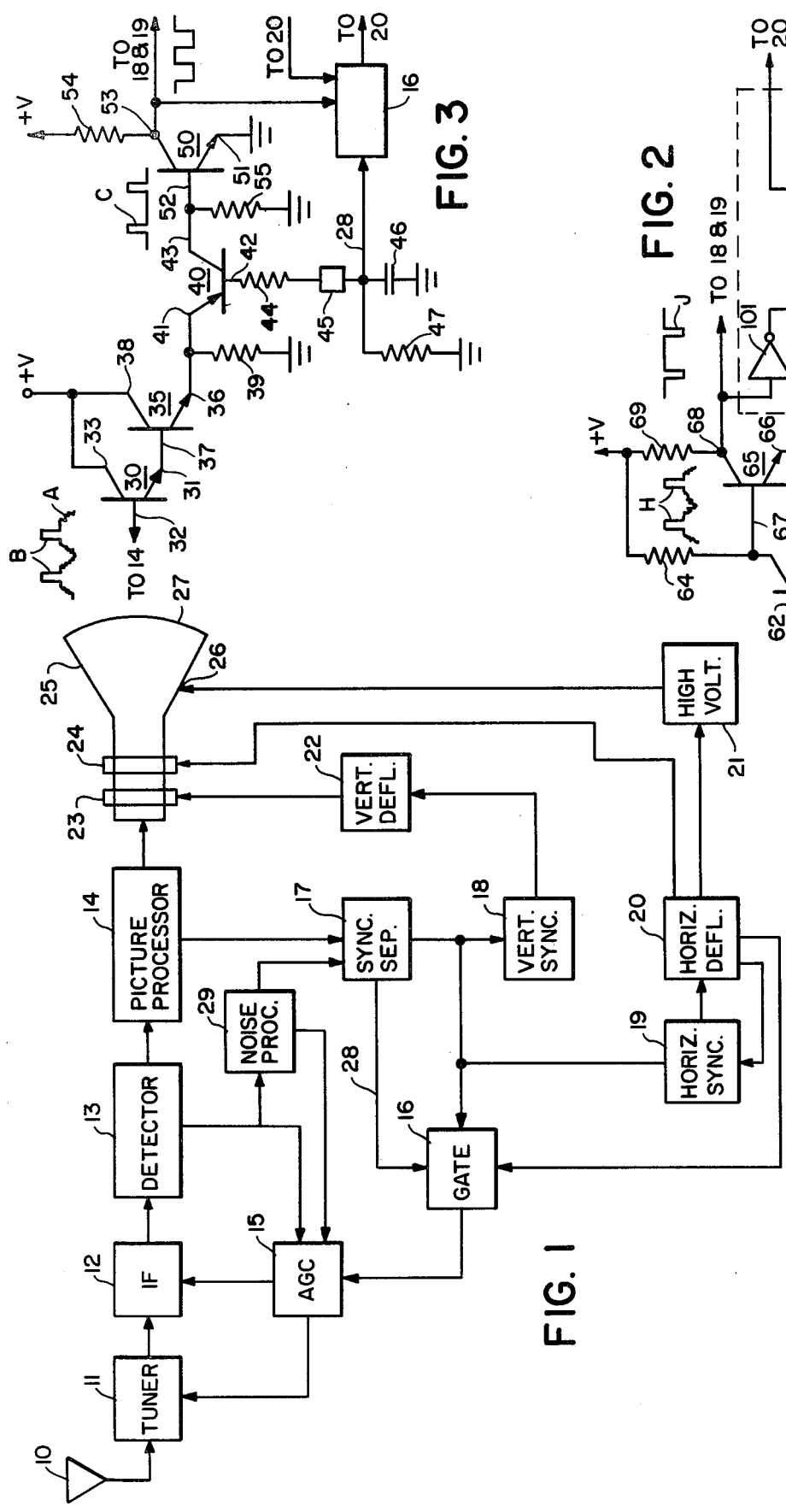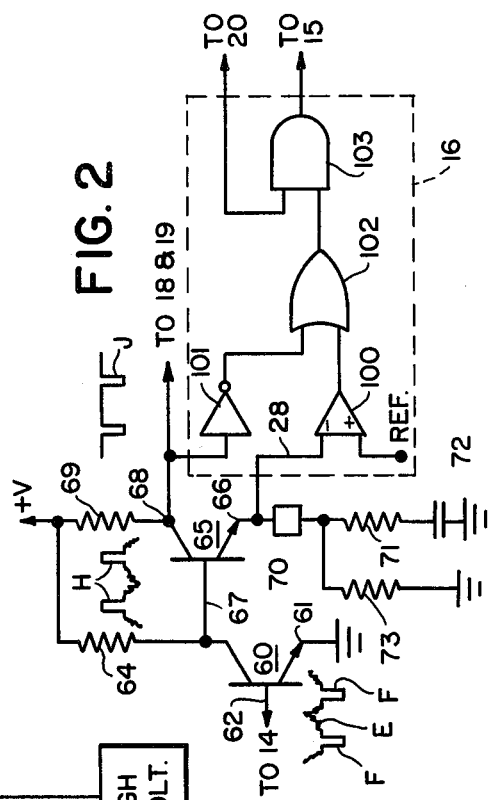

TELEVISION SYNCHRONIZING SIGNAL SEPARATING CIRCUIT

BACKGROUND OF THE INVENTION

This invention relates to synchronizing signal separator circuits for use in television receivers.

The television broadcast signal comprises a combination of picture information (which includes both luminance and chrominance components), sound information, and synchronization signals. The latter take the form of pulse-like signals occurring at both the horizontal and vertical scan rates which are interspersed between the scan interval picture components in the period generally referred to as the retrace interval. In addition, the polarity of these scan synchronizing signals corresponds to black picture elements but their magnitude is in excess of black (i.e., "blacker than black" level). Deflection synchronizing signals also are representative of unmodulated radio frequency carrier making them particularly useful as an indication of signal strength for the receiver's automatic gain control AGC system.

Because the synchronizing signals or "sync pulses" occupy amplitude portions of the signal in excess of the picture information extremes, they are most generally separated from the remainder of the signal by an amplitude, or threshold, responsive circuit. The types of circuitry used to perform this synchronization signal separation are of almost endless variety but all may be said to perform several basic functions. First, most sync separators include a clamp circuit in which a voltage, in some measure proportional to the synchronization pulse amplitude, is stored as a reference bias. Secondly, a clipper or slicing circuit which is responsive to the clamp level conducts only during a selected portion of the sync signal to the exclusion of picture components. Finally, processing circuitry increases the amplitude of the recovered synchronization pulses and forms them into appropriate limited digital-type signals which may readily be utilized by the receiver deflection synchronization circuitry. The processing circuitry generally includes noise elimination systems the importance of which to the present invention is made more apparent below.

As mentioned, the sychronization pulse, because of its direct relationship with carrier amplitude, forms the basis for the majority of AGC system action within the receiver. In contrast, the amplitude of the picture information varies greatly due to scene content rather than signal strength alone and is therefore not a reliable indicator of required gain correction. As in the case of synchronization signal separation, the variety of AGC systems in the art is practically endless, but all perform the functions of sampling the received signal strength (i.e., sync pulse level) and producing an error voltage which is applied in a negative feed-back manner to gain control circuitry within the tuner and intermediate frequency amplifiers to provide a closed loop system having a substantially constant output signal level.

It has been found by practitioners in the art that coincidence gating the AGC system sampling circuit (often called the AGC detector) produces enhanced performance by assuring that the AGC system will respond solely to the carrier indicative sync pulses and not the varying picture components or excessive noise within the signal absence of horizontal synchronization. Most commonly, AGC coincidence gating is accomplished by providing an "AND" gate responsive to both the sync pulse signal and the horizontal deflection retrace signal which enables the AGC detector only in the event a sync pulse and retrace signal are simultaneously applied. Coincidence gating provides substantial improvement in television receiver AGC system performance. However, it does under conditions of extreme and rapid signal transition produce a malfunction commonly referred to as AGC "lock-out". This malady is well-known in the art manifesting itself in the absence of synchronization pulses when either an abrupt overload (i.e. signal excess) or signal decrease is imposed upon the receiver. In the case of an overload, the overdriven intermediate frequency amplifier cannot handle the excess signal and goes into limiting before the AGC system can respond with the needed gain reduction. This limiting raises much or all of the picture information beyond the level of sync signals creating a condition which the receiver noise processing system interprets as noise. The response of the noise processor is to turn off the sync separator. In the event of an abrupt reduction of signal or temporary signal loss, the signal excursions of sync information drop below the clamp level and no sync pulses are recovered. In both cases, the actual lock-out arises because of the AGC systems' inability to respond with an appropriate gain adjustment in the absence of synchronizing pulses to enable the coincidence gate.

A common system of preventing such AGC lock-out is set forth in U.S. Pat. No. 3,624,290. Simply stated, the system therein sets forth a capacitive coupling between the sync separator and the AGC coincidence gate in such a manner that a "hold-off" voltage is produced between sync pulses. In the absence of synchronizing pulses, the hold-off voltage at the coincidence gate established by the sync signals begins to diminish. If the absence of sync becomes prolonged (as it would during AGC lock-out), the hold-off voltage becomes insufficient to inhibit the coincidence gate which in turn overrides the coincidence requirement. Upon override of the coincidence gate the AGC system samples the applied signal during each horizontal retrace signal allowing recovery of the AGC system. This system provides a satisfactory performance solution to the AGC lock-out problem but requires a large capacitor for the AC coupling between sync separator and AGC coincidence gate. In the environment of integrated circuitry, such large capacitors are not readily formed within the integrated circuit and the use of this system necessitates using additional terminals for coupling via an external capacitor. The number of such terminals available in most integrated circuits is limited and it is desirable to avoid such situations where possible.

In addition to the aspects of synchronizing signal separation associated with AGC system performance there are, of course, criteria of effective signal separation which relate to the synchronization of the horizontal and vertical deflection systems. It is desirable in many television receivers, and perhaps mandatory in others, that the amplitude and duration of the separated sync pulses supplied to the deflection synchronizing systems be maintained substantially constant. It is desirable to recover the sync signals unaltered in duration. However, the concern is not so much the fidelus reproduction of the received synchronizing signals because predictable or "fixed" distortion of the amplitude or width, or both together, may be compensated for in synchronizing system design. The most serious concern rests with variations of sync signal in response to differing signal conditions. Such variable distortions cannot readily be compensated for and invariably cause disturbances of the deflection synchronizing system. For these reasons, it is a primary objective in the fabrication of most television receiver sync separator circuitry to provide substantially constant amplitude synchronizing signals the durations of which remain preserved.

Accordingly, it is an object of the present invention to provide an improved synchronizing signal separation circuit for use in a television receiver. It is another object of the present invention to provide a synchronizing signal separation circuit which lends itself to inclusion within an integrated circuit and requires a minimum number of external terminals. It is a further object of the present invention to provide an improved synchronizing signal separation circuit which produces synchronization pulses having substantially constant amplitude and of unaltered duration.

SUMMARY OF THE INVENTION

A synchronizing signal separation circuit for use in a television receiver having a source of composite signal which includes modulation components of picture information together with vertical and horizontal display synchronizing information, includes a transistor amplifier having input, common, and output electrodes, means D.C. coupling the input electrode to a source of composite signal, means coupling the output electrode to a source of operating potential, and clamp means coupled to the common electrode producing a bias potential thereon with respect to the input electrode whereby the transistor conducts only during said synchronizing signals at a level such that saturation of the transistor is avoided.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIG. 1 is a block diagram representation of a television receiver constructed in accordance with the present invention.

FIG. 2 is a schematic detail of one embodiment of the present invention sync signal separating circuit.

FIG. 3 is a schematic detail of an alternate embodiment of the present invention sync signal separating circuit.

DESCRIPTION OF THE PREFERRED EMBODIMENT

FIG. 1 shows a television receiver constructed in accordance with the present invention. An antenna 10 is coupled to a tuner 11, the output of which is coupled to an intermediate frequency (IF) amplifier 12. The output of intermediate frequency amplifier 12 is coupled to a detector 13 which in turn is coupled to a picture processor 14 and AGC system 15. The output of picture processor 14 is coupled to a cathode ray tube 25 and to a sync separator 17. The latter has its output coupled to a vertical sync system 18, a horizontal sync system 19 and coincidence gate 16. Sync separator 17 has an additional coupling line 28 to coincidence gate 16. Vertical sync system 18 is coupled to a vertical deflection system 22 which in turn is coupled to a vertical deflection yoke 23. Similarly, horizontal sync system 19 is coupled to a horizontal deflection system 20, one output of which is coupled to a horizontal deflection yoke 24 and the other is coupled to a high voltage generator 21 which is coupled to an ultor anode 26 of CRT 25. An additional signal coupling from horizontal deflection system 20 is applied to coincidence gate 16. The output of coincidence gate 16 is coupled to AGC system 15 which has outputs coupled to IF amplifier 12 and tuner 11. A noise processor 29 is driven by the output of detector 13 and is coupled to AGC 15 and sync separator 17.

In operation under normal signal conditions, a received broadcast signal incident on antenna 10 drives tuner 11 which by the familiar heterodyning process converts the received broadcast signal to an intermediate frequency signal which is amplified by IF amplifier 12 to a level sufficient to drive detector 13. The modulation picture components (both luminance and chrominance) and synchronizing signals are recovered from the intermediate frequency signal by detector 13 which may be constructed using any of the well-known amplitude detection systems. Picture processor 14 includes conventional luminance and chrominance processing circuitry which further processes and amplifies the applied signal to a level and condition appropriate to drive the control electrodes (not shown) of CRT 25 and thereby intensity modulate the image displayed on viewing screen 27.

Sync separator 17 is driven by a composite signal, that is, one containing picture information components as well as deflection synchronizing signals. Sync separator 17 provides an amplitude selection of the synchronizing pulses, processes them to suitable constant-amplitude constant-duration signals by means described in greater detail below. The synchronizing pulses are applied directly to horizontal sync system 19 which includes a conventional horizontal automatic phase control (APC) system. An error signal produced within APC system 10 through phase comparison of the sync and retrace signals is coupled to a conventional voltage controlled oscillator within horizontal deflection system 20 thereby synchronizing the receiver horizontal scan of screen 27 to the received signal. In addition, the retrace signal portion of the scan waveform produced by horizontal deflection system 20 is utilized by high voltage system 21 to produce a high voltage accelerating potential suitable for operation of CRT 25.

The composite synchronizing pulses, that is both horizontal and vertical rate signals, are applied to vertical sync system 18 which by the familiar integrating process separates the vertical rate synchronizing pulses from the horizontal rate signals and processes the former to generate a suitable signal for application to vertical deflection system 22. In response to the applied vertical rate synchronizing pulses, vertical deflection system 22 produces an appropriate vertical rate deflection signal sufficient to drive deflection yoke 23 and provide vertical scan of viewing screen 27 in synchronism with the received signal information.

The output sync pulses derived by sync separator 17 are additionally coupled to one input of coincidence gate 16. The other input of coincidence gate 16 is driven by the horizontal retrace portion of the horizontal deflection signal. Under normal signal conditions, the horizontal sync signals and horizontal retrace signal are simultaneously present at the inputs to coincidence gate 16 causing the gate to provide an enabling, or keying, signal which is applied to AGC system 15. AGC system 15 includes the conventional comparator circuitry by which the applied composite video signal from detector 13 is sampled during the horizontal sync pulse interval in response to the keying signal from coincidence gate 16. The sync pulse amplitude present during keying is compared to an internally generated reference voltage in such manner that a control signal representing the deviation of sync pulse amplitude from the desired level is produced and applied to the gain control inputs of turner 11 and IF amplifier 12 in a negative feed-back manner to stabilize detector output.

Turning now to a discussion of system performance in the event of an abrupt change in applied signal level, the operation of all the described systems remains the same with the exception of sync separator 17, coincidence gate 16 and AGC system 15. When signal level abruptly increases, the above-described signal crushing occurs triggering noise processing system 20 response which turns off sync separator 17. In the absence of sync signal, both horizontal and vertical deflection systems 20 and 22 respectively continue to operate at or about the last established frequency resulting in a continuation of CRT scan and high voltage production. However, in the absence of synchronizing pulse inputs to coincidence gate 16, the comparator function of AGC system 15 is not enabled. As a result, the now incorrect gain control voltages established for tuner 11 and IF amplifier 12 prior to the abrupt transition remain, causing continued limiting or crushing of signal translation.

At this point, the system is stalemated. Without a change in signal amplitude sync separator 17 will not turn on and, coincidence gate 16 will not enable AGC system 15 to allow the needed changes of the gains of IF amplifier 12 and tuner 11. After continued absence of sync signal an override signal is derived within sync separator 17 to alleviate this lock-out condition by means described below in greater detail. This override signal coupled via connection line 28 defeats the coincidence requirement of gate 16 and causes the application of an enabling of keying signal to AGC system 15 during each horizontal retrace pulse which then begins sampling the applied detector output signal and providing an appropriate reduction of tuner and IF gain. This gain reduction continues until the signal level is decreased such that sync separator 17 can again produce sync pulse signals, at which time the override signal is removed and gate 16 again responds solely to the coincidence of sync and horizontal retrace signals.

A similar chain of events results from a sudden decrease of applied signal in which case the previously existing AGC gain control voltages provide insufficient tuner and IF amplifier gain and sync separator 17 again fails to produce the required synchronizing pulses. As with the situation of too much signal, a period of AGC lock-out results but the continued absence of synchronizing pulse signal causes the generation of an override signal by sync separator 17 which is applied via connecting line 28 to coincidence gate 16 again defeating the coincidence requirements and causing AGC system 15 to sample the detector output signal during each horizontal retrace signal. Once this sampling occurs, the insufficient detector output voltage level is sensed by AGC 15 and appropriate gain control voltages are produced which increase tuner and IF gain until synchronizing pulses are again recovered by sync separator 17. After this, the system again returns to normal coincidence gated function.

FIG. 2 shows a common emitter embodiment of synchronizing signal separator 17 and coincidence gate 16. A transistor 60 has an emitter electrode 61 connected to ground, a base electrode 62 connected to picture processor 14 and a collector electrode 63 coupled to a source of operating potential +V by a resistor 64. A sync separator transistor 65 has an emitter electrode 66 connected to a terminal pin 70, a base electrode 67 connected to collector 63 and a collector electrode 68 coupled to a source of operating potential +V by a resistor 69. A resistive capacitive network formed by the series combination of a resistor 71 and a capacitor 72 couples terminal pin 70 to ground. In addition, a resistor 73 is coupled between terminal pin 70 and ground. Collector electrode 68 is coupled to a conventional amplifier 75, the output of which is coupled to vertical and horizontal sync systems 18 and 19 respectively. Collector 65 is also connected to an inverting amplifier 101 the output of which is connected to one input of an OR gate 102. Emitter 66 is connected to the inverting input of a comparator 100, the non-inverting input of which is connected to a reference potential. The output of comparator 100 is connected to the remaining input of OR gate 102. An AND gate 103 has one input connected to the output of OR gate 102 and the other input coupled to horizontal deflection 20. The output of AND gate 103 is coupled to AGC 15.

The operation of the present invention system is best understood if normal signal levels are first described. The composite signal (waveform E) which includes picture information together with negative going synchronizing pulse signals (shown as portion F) is applied to base 62 of common emitter transistor 60 which by well-known amplification principles produces an inverted and amplified signal (waveform G) having positive going sync pulse components (shown as H) applied to base 67 of sync separator transistor 65. The positive going synchronizing components (H) at base 67 forward bias the emitter-base junction of transistor 65 causing the flow of emitter current which charges capacitor 72. In addition, during the time capacitor 72 is charging, a corresponding current flow in the collector circuit of transistor 65 is produced which in turn establishes a corresponding voltage across resistor 69 in the form of a negative going sync signal (shown as waveform J) at collector 68. Under normal signal conditions, capacitor 72 becomes rapidly charged and an equalibrium situation develops in which a small discharge of capacitor 72 through the discharge path formed by resistors 71 and 73 occurs during the period between sync signals which is replaced by each recurring synchronizing pulse. The collector current of transistor 65 produced during the short charge interval flows only during the presence of sync pulse signals causing the output signal at collector 65 to be exclusively composed of synchronizing pulse signals.

The emitter-base junction of transistor 65 together with the charge-discharge network formed by capacitor 72 and resistors 71 and 73 cooperate to form a clamp circuit and establish the bias voltage at emitter 66. The bias voltage, which is determined by the relative values of emitter 66. The bias voltage, which is determined by the relative values of resistance and capacitance used in the clamp, determines two important criteria of sync signal separation. First, the DC voltage present at emitter 66 establishes the amplitude of sync pulse signal at which transistor 65 conducts. This assures that only sync-signal-caused currents will flow in transistor 65. In addition, the use of a signal dependent bias at emitter allows the stage to compensate for many variations of sync signal input. Second, the level of conduction by transistor 65 during sync is controlled by the values of resistor 71 and capacitor 72 and input sync level. While the stage may be operated at a saturation level, it has been found advantageous to select component values which prohibit saturation. This avoids the increased pulse duration (or "pulse stretching") at collector 68 providing a faithfully reproduced synchronization signal.

The negative-going sync pulses at collector 68 are inverted by inverter 101 and appear as positive-going pulses at one input of OR gate 102. The positive bias at emitter 66 is applied to comparator 100 which produces a "high" output signal in the event the bias decreases below the reference potential. The importance of this will be described in greater detail below. Suffice it to say here that the output of comparator 100 remains low under normal signal conditions. OR gate 102 responds with a high output signal when either of its inputs is high. Therefore under normal signal conditions, its output goes high at the occurrence of each sync pulse causing a high at one input of AND gate 103. The horizontal retrace signal applied to the other input of AND gate 103 is positive-going which produces a second high input. When the sync and retrace signals are coincident the output of AND gate 103 goes high to produce a keying signal which is applied to AGC 15.

In the absence of sync pulse signals due to the above-described signal disturbances, inverter 101 no longer supplies positive-going signals to OR gate 102 and without a high at one of its inputs, OR gate 102 no longer supplies positive-going signal to AND gate 103 which terminates the production of keying signals and inhibits AGC 15. However as mentioned in the absence of sync signal at base 67, transistor 65 does not conduct and capacitor 72 continues to discharge. After a predetermined interval, the bias input to comparator 100 decays below the reference voltage which causes the comparator output to go high which in turn causes a high at one input of OR gate 102.

With one of its inputs high, OR gate 102 again produces a high output for one input of AND gate 103. Upon the next occurrence of a horizontal retrace pulse, AND 103 has both inputs high and again produces a keying signal for AGC 15. This mode of operation continues until sync pulses are again produced by transistor 65 after which capacitor 72 again charges up turning off comparator 100 and restoring the system to coincidence gated operation.

FIG. 3 shows a schematic detail of an alternate embodiment of sync separator 17 together with coincidence gate 16 in block form. A transistor 30 having an emitter electrode 31, base electrode 32 coupled to picture processor 14 and a collector electrode 33 coupled to a source of operating potential +V together with a transistor 35 having an emitter electrode 36 coupled to ground by a resistor 39, a base electrode 37 connected to emitter 31 and a collector electrode 38 connected to collector 33 from a Darlington input circuit. A PNP transistor 40 having an emitter electrode 41 connected to emitter electrode 36, base electrode 42 coupled to a terminal pin 45 by a resistor 44 and a collector electrode 43 coupled to ground by a resistor 55 forms a common base sync separator circuit. A parallel combination of a resistor 47 and a capacitor 46 couple terminal pin 45 to ground. In addition, terminal pin 45 is coupled to coincidence gate 16. A transistor 50 having an emitter electrode 51 connected to ground, a base electrode 52 connected to collector 43, a collector electrode 53 coupled to a source of operating potential +V by a resistor 54 forms a common emitter amplifier. Collector 53 is coupled to vertical and horizontal synchronizing systems 18 and 19 respectively. Coincidence gate 16 is also coupled to horizontal deflection 20 and should be understood to include the same sub-system set forth in detail in FIG. 2.

Again considering normal operation initially, the composite signal (waveform A) produced by signal processor 14 is applied to the input of the Darlington combination of transistors 30 and 35 and appears in like replica at emitter electrode 41. Because the common-base amplifier configuration of transistor 40 and associated components has an extremely low impedance, the Darlington input circuit is desired to provide an impedance match between picture processor 14 and the low impedance stage input. In similar behavior to the system of FIG. 2, the positive-going sync signal excursions of waveform A forward bias the emitter-base junction of transistor 40 simultaneously causing a flow of base current through resistor 44 which charges capacitor 46 and a collector current which establishes a positive voltage across resistor 55 causing the output waveform C to appear at collector 43. During the flow of collector current, the collector of transistor 40 (and base of transistor 50) reaches a sufficient positive voltage with respect to grounded emitter 51 (approximately 0.6 volts), to forward-bias the emitter-base junction of transmitter 50 which simultaneously produces two effects. Firstly, the forward conduction of the diode between base 52 and emitter 51 limits the amplitude of signal developed at collector 43 to the above mentioned 0.6 volts. Secondly, the forward bias of the emitter-base junction causes a collector current flow in transistor 50 which produces an amplified and inverted polarity replica (signal D) at collector 53. The amplitude limiting caused by the emitter-base junction of transistor 50 provides an important aspect of the present invention in that transistor 40 is prohibited from entering saturation during its periods of conduction. As mentioned, this inhibition of sync separator saturation is desirable because it avoids one of the primary sources of undesired sync pulse "stretching".

As mentioned above, under normal signal conditions the recovered composite signal produced by picture processor 14 assumes the character of waveform A in which case an equilibrium is established between the amplitude of applied signal and the voltage stored in capacitor 46 under which a small discharge of capacitor 46 via resistor 47 occurs between synchronizing pulses, to be replaced by the next occuring sync pulse. Each charging current pulse causes collector current flow through resistor 55 and the production of waveform C at base 52 which in turn causes the amplified and inverted replica signal (waveform D) to be produced at the output of transistor 50. Again as in the system shown in FIG. 2, the emitter base junction (of transistor 40 in this case) and the charge-discharge network formed by capacitor 46 and resistors 44 and 47 form a clamp circuit which biases base 42 and establishes the sync signal level at which transistor 40 conducts.

When the above-described abnormal signal transitions occur, the emitter-base junction of transistor 47 does not become periodically forward biased which in turn causes a cessation of capacitor 46 periodic charging. The output waveform of transistor 50 therefore no longer provides coincidence gating of gate 16 which inhibits operation of AGC 15. However, if the signal abnormality persists, capacitor 46 begins to discharge through resistor 47 causing a reduction of the positive voltage stored therein. By the operations set forth in detail in conjunction with FIG. 2, a point is reached when this reduced positive voltage causes the override within coincidence gate 16 (see comparator 100, OR gate 102 and AND gate 103 in FIG. 2) to remove the coincidence gating requirement and cause AGC system 15 to respond solely to the horizontal retrace signal until normal sync is restored.

What has been shown is an improved synchronizing signal separating circuit which avoids prohibitive signal circuit amplitude and duration distortions. The circuit shown readily lends itself to integration within a monolithin integrated circuit and requires only a single externally accessible terminal for single-ended connection to an external clamp circuit R-C network. In addition, the circuit is made more attractive to integrated circuit packaging because of its facilitation of DC coupling of the synchronizing signal to the AGC system coincidence gate thereby removing the need for externally accessible coupling capacitors. Finally, the circuit shown utilizes a single sync separator stage which simultaneously produces a separated synchronizing signal and an anti-lock-out signal for defeating AGC coincidence gating. The described system in preferred form inhibits saturation of the sync separator stage thereby minimizing deleterious sync pulse stretching.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. A synchronizing signal separation circuit for use in a television receiver having a source of composite video signal which includes modulation components of picture information together with vertical and horizontal display synchronizing information, said separation circuit comprising:
    a transistor amplifier having input, common, and output electrodes;
    means D.C. coupling said input electrode to said source of said composite signal;
    means coupling said output electrode to a source of operating potential; and
    clamp means coupled to said common electrode producing a bias potential thereon with respect to said input electrode whereby said transistor conducts only during said synchronizing signals at a level such that saturation of said transistor is avoided.

2. A synchronizing signal separation circuit as set forth in claim 1 wherein said clamp means include a charge-discharge network, the input-to-common electrode junction of said transistor and said charge-discharge network cooperating during the occurrence of said synchronizing signals to produce said bias potential.

3. A synchronizing signal separation circuit as set forth in claim 2 wherein said charge-discharge network includes a parallel combination of a resistor and a capacitor.

4. A synchronizing signal separation circuit as set forth in claim 3 wherein said input, common and output electrodes respectively comprise the base, emitter and collector electrodes of said transistor.

5. A synchronizing signal separation circuit as set forth in claim 3 wherein said input, common, and output electrodes respectively comprise the emitter, base, and collector electrodes of said transistor.

6. For use in a television receiver having a tuner, an intermediate frequency amplifier, detecting means for recovering a composite signal including horizontal and vertical display synchronization components and picture information, horizontal display means producing a long-duration trace signal and short-duration retrace signal, and coincidence gated AGC means, responsive to coincidence of said horizontal retrace signal and said horizontal display synchronization signals, controlling the gain of said intermediate frequency amplifier; a combination synchronizing signal separation and AGC lock-out defeat circuit comprising:
    a transistor having input, common and output electrodes;
    first coupling means D.C. coupling said input electrode to said detecting means;
    second coupling means D.C. coupling said output electrode to said AGC means;
    charge-discharge means coupled to said common electrode, the input-to-common electrode junction of said transistor and said charge-discharge means cooperating to establish a bias voltage dependent upon the occurrence of said display synchronization signals; and
    means responsive to said bias means overcoming the coincidence requirement of said AGC means to render said AGC means operative solely in response to the occurrence of said horizontal retrace signals when said bias potential decays below a predetermined level.

7. A combination synchronizing signal separation and AGC lock-out defeat circuit as set forth in claim 6 wherein said transistor, said first and second coupling means; and said coincidence gated AGC means are contained within a common integrated circuit having a plurality of externally accessible terminal and wherein said charge-discharge means are external to said integrated circuit and coupled to said common electrode via a single terminal.

8. A combination synchronizing signal separation and AGC lock-out defeat circuit as set forth in claim 7 wherein said input, common and output electrodes respectively comprise the base, emitter and collector electrodes of said transistor.

9. A combination synchronizing signal separation and AGC lock-out defeat circuit as set forth in claim 7 wherein said input, common, and output electrodes respectively comprise the emitter, base and collector electrodes of said transistor.

* * * * *